United States Patent
Mito et al.

(10) Patent No.: US 10,232,843 B2
(45) Date of Patent: Mar. 19, 2019

(54) FUEL MAINTENANCE GUIDE SYSTEM IN HYBRID VEHICLE

(71) Applicant: MITSUBISHI JIDOSHA KOGYO KABUSHIKI KAISHA, Tokyo (JP)

(72) Inventors: Hideki Mito, Tokyo (JP); Naoki Miyamoto, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/916,692

(22) Filed: Mar. 9, 2018

(65) Prior Publication Data
US 2018/0257636 A1 Sep. 13, 2018

(30) Foreign Application Priority Data
Mar. 10, 2017 (JP) ................ 2017-046335

(51) Int. Cl.
| | | |
|---|---|---|
| *B60W 20/18* | (2016.01) | |
| *B60K 6/442* | (2007.10) | |
| *B60W 20/20* | (2016.01) | |
| *B60W 50/08* | (2012.01) | |
| *B60W 50/14* | (2012.01) | |

(52) U.S. Cl.
CPC ............ *B60W 20/18* (2016.01); *B60K 6/442* (2013.01); *B60W 20/20* (2013.01); *B60W 50/082* (2013.01); *B60W 50/14* (2013.01); *B60W 2050/146* (2013.01); *B60W 2560/02* (2013.01); *B60W 2560/04* (2013.01)

(58) Field of Classification Search
CPC ................................ B60K 6/22; B60W 20/18
See application file for complete search history.

(56) References Cited

U.S. PATENT DOCUMENTS

| | | | |
|---|---|---|---|
| 9,008,880 B2* | 4/2015 | Sangameswaran .... | B60K 35/00 701/22 |
| 2015/0019054 A1* | 1/2015 | Sangameswaran .... | B60K 35/00 701/22 |
| 2017/0088124 A1* | 3/2017 | Amin ................... | G07C 5/0808 |
| 2018/0001884 A1* | 1/2018 | Itagaki .................. | B60K 6/365 |

FOREIGN PATENT DOCUMENTS

JP 2016-88131 A 5/2016

* cited by examiner

*Primary Examiner* — James A Shriver, II
*Assistant Examiner* — James J Triggs
(74) *Attorney, Agent, or Firm* — Birch, Stewart, Kolasch & Birch, LLP

(57) ABSTRACT

A fuel maintenance guide system in hybrid vehicles in which a shift to the fuel maintenance mode giving priority to consuming fuel is executed automatically under a predetermined condition regardless of intention of a driver, the fuel maintenance guide system including: a residual fuel detecting unit detecting a residual amount of the fuel; a cancel condition determining unit determining a cancel condition for cancelling the shift to the fuel maintenance mode, based on the residual amount detected by the residual fuel detecting unit; and a displaying unit displaying the cancel condition determined by the cancel condition determining unit from a predetermined time period before the shift to the fuel maintenance mode.

10 Claims, 4 Drawing Sheets

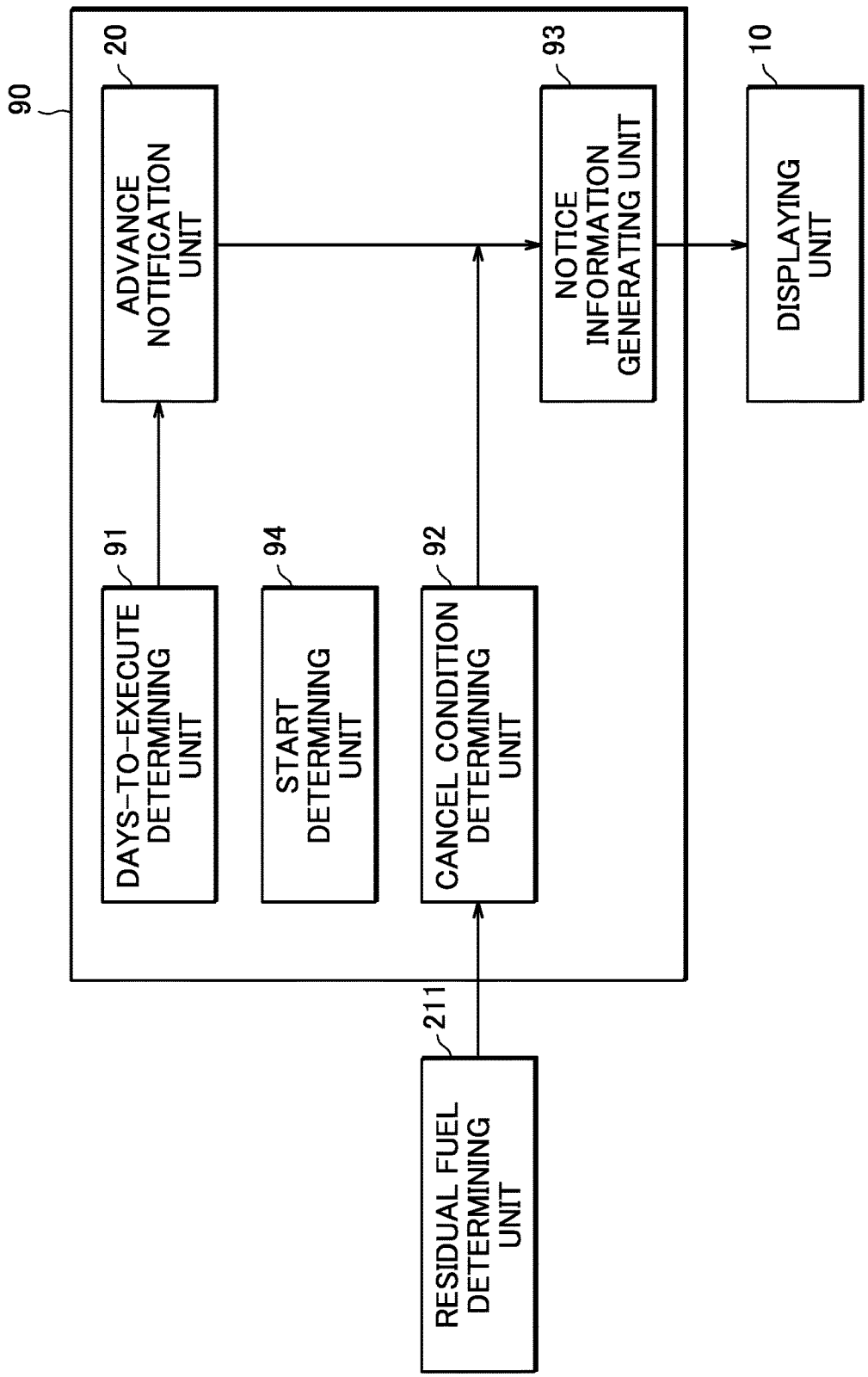

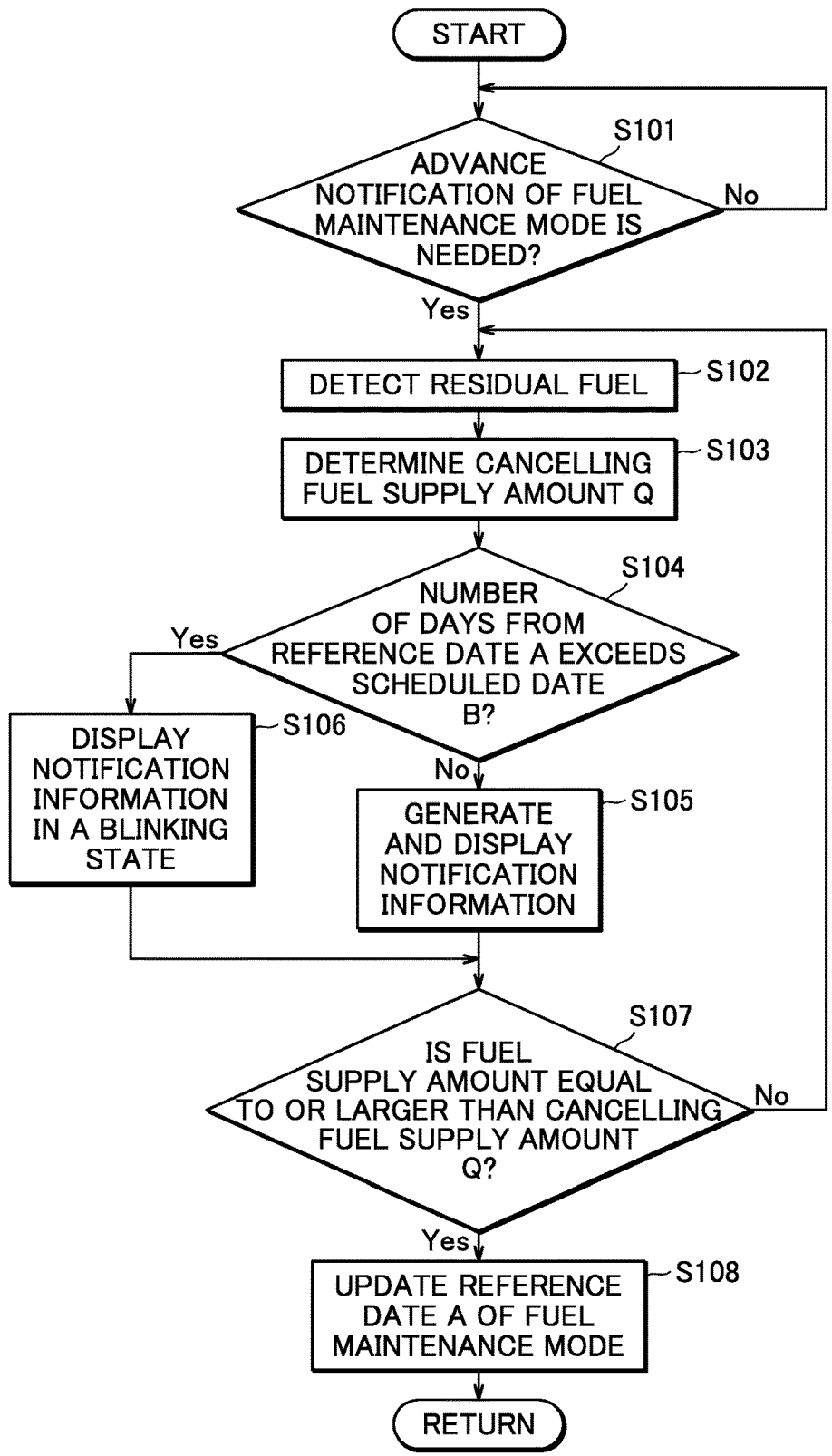

FUEL MAINTENANCE GUIDE SYSTEM IN HYBRID VEHICLE

BACKGROUND OF THE INVENTION

Field of the Invention

The present invention relates to a fuel maintenance guide system for hybrid vehicles.

Description of the Related Art

Hybrid vehicles driven by an internal combustion engine and an electric motor in combination are known. In recent years, distances that hybrid vehicles can travel using motors as main motive power have further increased owing to improvement in performance of rechargeable batteries that serve as electric power sources for the motors and development of a technology such as a plug-in hybrid system that enables rechargeable batteries to be charged using external commercial powers.

In particular, plug-in hybrid vehicles use different modes including an EV mode where driving wheels are driven by a motor, a series mode where the motor is used as a driving source while an engine is used as an electric power generator, and a parallel mode where both of the engine and the motor are used as driving sources, and other modes. Traveling urban areas particularly causes the EV mode to be largely selected in many cases for a purpose of reducing fuel consumption amount. At this point, fuel to be used by an engine remains loaded in a vehicle, and it is known that if a long period of time elapses with the loaded fuel remaining as it is, the fuel may suffer degradation or the like. Degraded fuel may impair performance such as output of the engine, fuel efficiency, exhaust gas, and the like.

Hence, there is a known technique for preventing degradation of unused fuel in such a manner that, upon a lapse of a given period of time from a last supply of fuel, a fuel maintenance mode is compulsorily switched to even in a travelling area where the EV mode is normally selected, the fuel maintenance mode being such that makes an engine run to drive a vehicle, promoting consumption of fuel.

However, as to the fuel maintenance mode that makes an engine run in this manner in a travelling range where the EV mode is normally selected, a reason for making the engine run is unclear, which leads to complaint of drivers who want to continue travelling in the EV mode. In addition, to leave the fuel maintenance mode, a sufficient supply of fuel is required to inhibit the degradation of fuel. For example, in a hybrid vehicle described in a Patent Literature (Japanese Patent Laid-Open No. 2016-88131), an amount of fuel to be supplied to leave the fuel maintenance mode is set constant, with a result that an amount of fuel larger than necessary has to be supplied even when an amount of residual fuel is small. This leads to compliant of drives who are largely travelling with the EV mode and want to do with minimum required fuel serving. Meanwhile, it is known that the smaller a residual fuel amount is, the smaller a supply of a fuel amount can inhibit deterioration of the fuel, and there is a need for displaying an appropriate amount of fuel serving to leave the fuel maintenance mode to drivers.

SUMMARY OF THE INVENTION

An object of the present invention, which has been made based on the problem described above, is to display how to cancel a shift to the fuel maintenance mode appropriately, in a simple manner in a hybrid vehicle.

A fuel maintenance guide system in a hybrid vehicle according to the invention of the present application is a fuel maintenance guide system in vehicles in which a shift to the fuel maintenance mode giving priority to consuming fuel is executed automatically under a predetermined condition regardless of intention of a driver, the fuel maintenance guide system including: a residual fuel detecting unit detecting a residual amount of the fuel; a cancel condition determining unit determining a cancel condition for cancelling the shift to the fuel maintenance mode, based on the residual amount detected by the residual fuel detecting unit; and a displaying unit displaying the cancel condition determined by the cancel condition determining unit from a predetermined time period before the shift to the fuel maintenance mode.

The present invention can provide a fuel maintenance system displaying how to cancel a shift to the fuel maintenance mode appropriately, in a simple manner in a hybrid vehicle.

BRIEF DESCRIPTION OF THE DRAWINGS

The present invention will become more fully understood from the detailed description given hereinafter and the accompanying drawings which are given by way of illustration only, and thus, are not limitative of the present invention, and wherein:

FIG. 4 is a block diagram illustrating an example of a functional configuration of a fuel maintenance guide system; and FIG. 5 is a flowchart illustrating an example of operation of the fuel maintenance guide system.

DETAILED DESCRIPTION OF THE INVENTION

Hereafter, description will be made about a vehicle 500, which is a plug-in hybrid vehicle equipped with a fuel maintenance guide system 100, as an embodiment of the present invention. Following description will be made in particular about a case where the vehicle with a plug-in hybrid system is equipped with the fuel maintenance guide system, but it should be noted that the present invention is not limited to such a configuration. Configurations and functions of the vehicle that are not directly connected to the present invention will not be described as appropriate.

Figure 1:
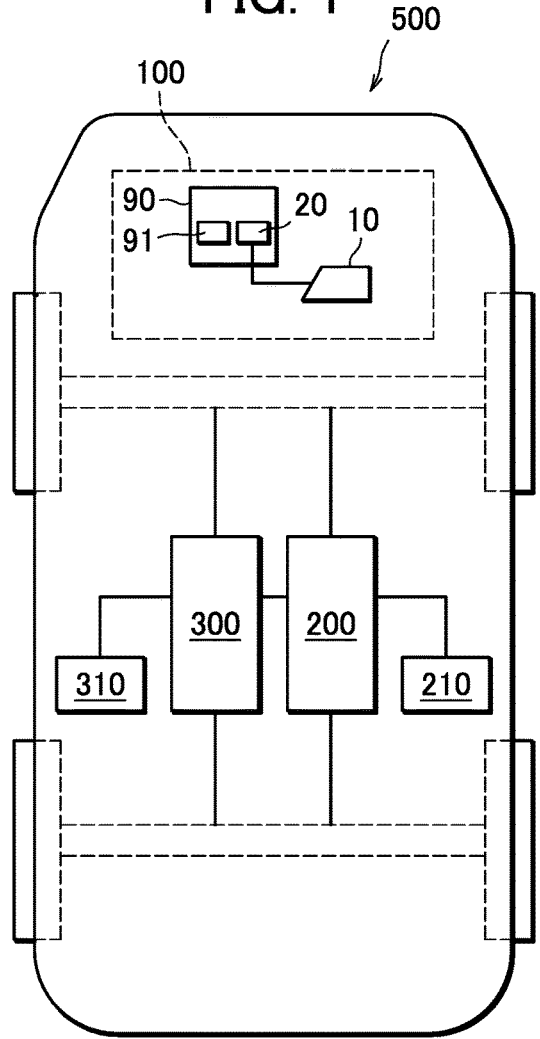
FIG. 1 is a diagram illustrating an example of a vehicle as an embodiment of the present invention.

The vehicle 500 includes, as illustrated in FIG. 1, an engine 200 being an internal combustion engine, a motor 300 being an electric motor, a fuel tank 210 storing fuel for the engine 200, and a drive battery 310 supplying electricity to the motor 300. The vehicle 500 has, as with the vehicle described in the above Patent Literature: an EV mode where wheels are driven by output of the motor 300 driven only by the electricity from the battery 310; a parallel mode where the wheels are driven by concurrent use of outputs of the motor 300 and the engine 200; and a series mode where the wheels are driven by the output of the motor 300 driven by electricity generated by the engine 200. In addition, the vehicle 500 has a fuel maintenance mode where, upon a lapse of a predetermined period from supply of fuel, the engine 200 is made to compulsorily run to prevent degradation of the fuel in the fuel tank 210. In other words, in this fuel maintenance mode, the vehicle 500 can be made to drive in the parallel mode or the series mode according to a travelling state of the vehicle.

The vehicle 500 includes a displaying unit 10 displaying a state of the vehicle 500 to a driver, and a controlling unit 90 controlling the fuel maintenance guide system 100. The controlling unit 90 includes an days-to-execute determining unit 91 being an estimating unit estimating a period until degradation of the fuel, and an advance notification unit 20 performing notification to cause the displaying unit 10 to perform the displaying from a predetermined time period before a fuel maintenance start date estimated by the days-to-execute determining unit 91. The controlling unit 90 causes the vehicle 500 to automatically make a shift to the fuel maintenance mode on a condition that the fuel maintenance start date estimated by the days-to-execute determining unit 91 is passed. The vehicle 500 includes a residual fuel detecting unit 211 being a detecting unit installed on the fuel tank 210 and detecting a state of the fuel. The residual fuel detecting unit 211 measures a current amount of the fuel loaded in fuel tank 210.

The fuel maintenance mode refers to a mode where the engine 200 is used to make the vehicle 500 operate in the series mode or the parallel mode even under, for example, such a driving condition that usually makes the vehicle operate as an electric vehicle by driving the motor 300 (EV mode), aiming to prevent the degradation of the fuel. Specifically, the fuel maintenance mode refers to a state where the vehicle 500 is compulsorily driven by the engine 200 even at low speeds. Aiming to prevent the degradation of the fuel, such a fuel maintenance mode is desirably cancelled on a condition that a predetermined proportion or more of the fuel stored in the fuel tank 210 is replaced. In the present embodiment, the fuel maintenance mode is cancelled on a condition that, for example, 10 L (liter) or more of fuel is supplied at a time when a residual fuel amount in the fuel tank 210 is 20 L. It should be noted that the present embodiment is not limited to such a ratio, and the fuel maintenance mode may be cancelled on a condition that a necessary and sufficient amount of fuel supply to prevent the degradation of the fuel.

Figure 2:
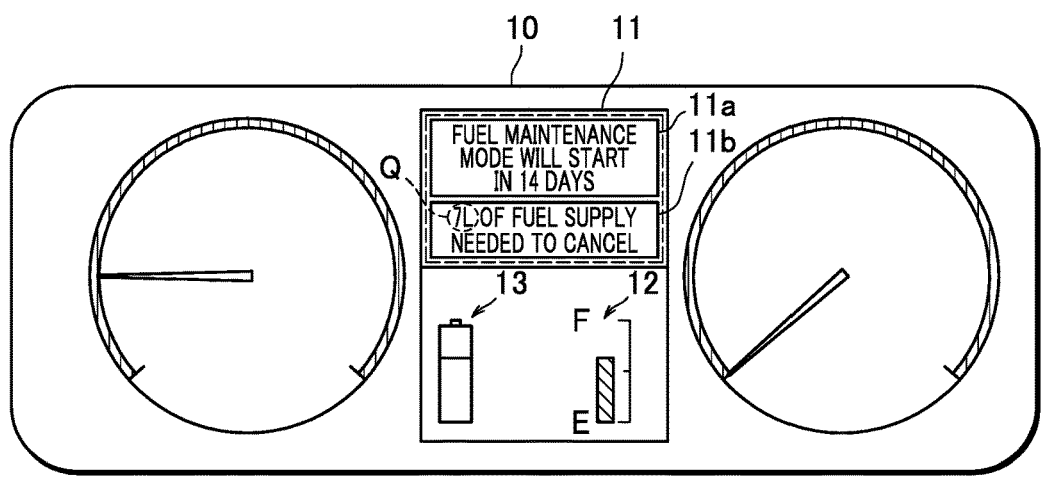
FIG. 2 is a diagram illustrating an example of a configuration of a displaying unit illustrated in FIG. 1.

The displaying unit 10 is a display displaying a state of the vehicle 500 to a driver being a user of the vehicle 500, as illustrated in FIG. 2. The displaying unit 10 includes a state displaying unit 11 displaying information on the fuel maintenance mode, a fuel displaying unit 12 displaying a residual amount of the fuel stored in the fuel tank 210, and an electricity displaying unit 13 displaying residual electricity of the drive battery 310.

The state displaying unit 11 includes a shift notice displaying unit 11a displaying notice of a shift to the fuel maintenance mode based on the residual amount of the fuel detected by the residual fuel detecting unit 211, and a cancel condition displaying unit 11b displaying a cancelling fuel supply amount Q to be described later. The fuel displaying unit 12 displays the residual amount of the fuel detected by the residual fuel detecting unit 211.

The controlling unit 90 includes, as illustrated in FIG. 4, a cancel condition determining unit 92 determining a cancel condition for cancelling the shift to the fuel maintenance mode, a notice information generating unit 93 displaying the cancel condition, and a start determining unit 94 determining whether the fuel maintenance mode is entered.

The cancel condition determining unit 92 determines, as described above, the cancelling fuel supply amount Q based on an amount of the fuel loaded in the fuel tank 210 detected by the residual fuel detecting unit 211, the cancelling fuel supply amount Q being a cancel condition for cancelling the fuel maintenance mode. It should be noted that the present embodiment is not limited to such a ratio, and the fuel maintenance mode may be cancelled on a cancel condition that a necessary and sufficient amount of fuel supply to prevent the degradation of the fuel. The notice information generating unit 93 causes the displaying unit 10 to display the cancelling fuel supply amount Q being the cancel condition determined by such a cancel condition determining unit 92.

Figure 3:
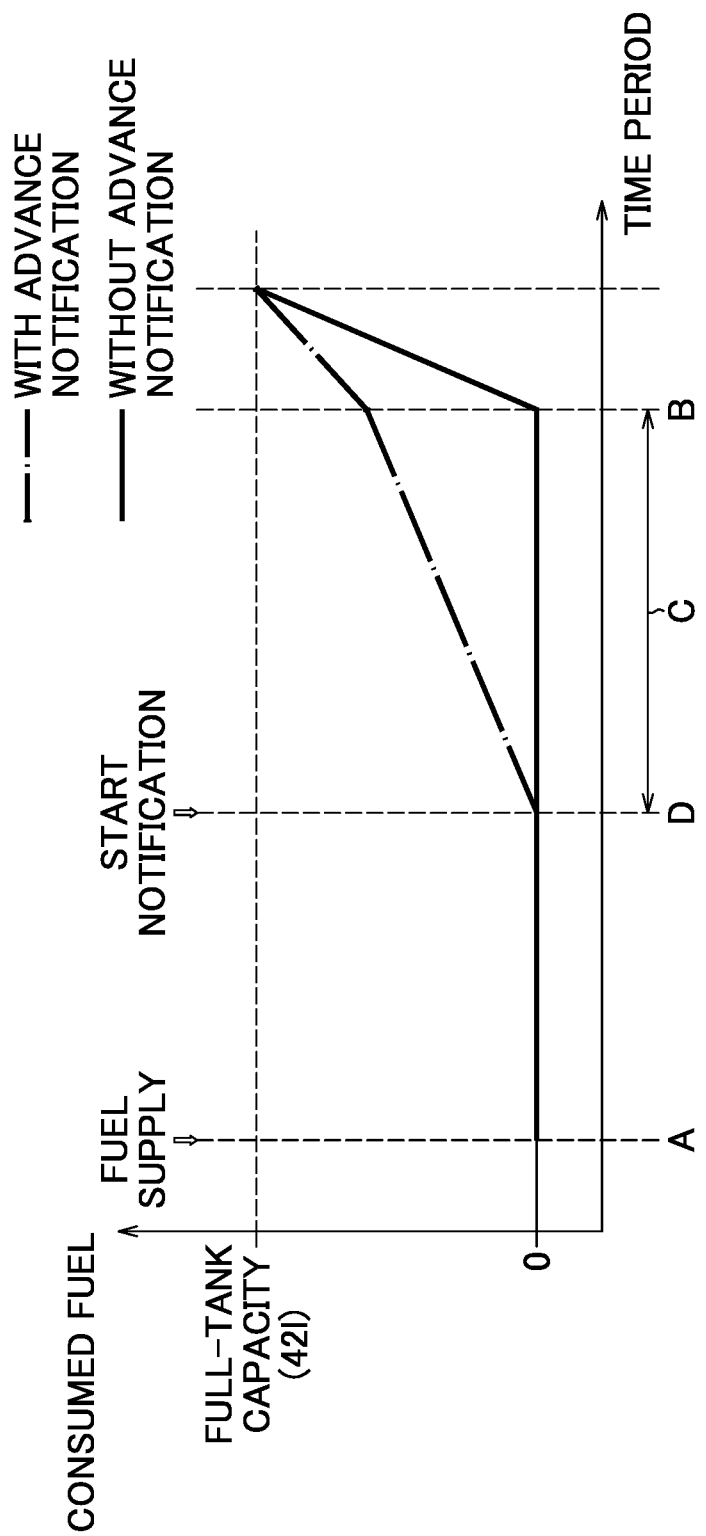
FIG. 3 is a graph illustrating an example of variations in fuel consumption amount of a vehicle.

As illustrated in FIG. 3, based on information from the residual fuel detecting unit 211, the days-to-execute determining unit 91 sets a reference date A of fuel supply on a condition that a predetermined amount of fuel is supplied in the fuel tank 210. The predetermined amount is initially set at, for example, 15 L. In addition, the days-to-execute determining unit 91 determines a date three months from the reference date A as a scheduled date B being the fuel maintenance start date on which the vehicle 500 makes a shift to the fuel maintenance mode. Although, in the present embodiment, a period until degradation of fuel is estimated to be six months, and the scheduled date B for starting fuel maintenance is set to be three months, as an example, it should be noted that the period is not limited to such a period and may be a given period. In other words, the days-to-execute determining unit 91 has a function as estimating means estimating the period until the degradation of the fuel from when the fuel is supplied to the vehicle 500. Although the days-to-execute determining unit 91 is supposed to determine a number of days in the present embodiment, it should be noted this is not intended to limit expression of the predetermined time period such as a number of days, a number of hours, and a number of months, and the days-to-execute determining unit 91 may be any one that can determine the predetermined time period.

When the scheduled date B is determined, the advance notification unit 20 notifies the notice information generating unit 93 that the notice information generating unit 93 causes the shift notice displaying unit 11a of the displaying unit 10 to display that the fuel maintenance mode will be entered from a notification start date D earlier than the scheduled date B by a predetermined time period C. In other words, the advance notification unit 20 orders the notice information generating unit 93 to cause the shift notice displaying unit 11a of the displaying unit 10 to display the predetermined time period C as a shift period until the shift to the fuel maintenance mode.

The state displaying unit 11 displays the scheduled date B provided by the advance notification unit 20 together with the cancelling fuel supply amount Q determined by the cancel condition determining unit 92.

The start determining unit 94 determines whether a current date is later than the scheduled date B with respect to the reference date A to determine whether the vehicle 500 is in the fuel maintenance mode.

When the advance notification unit 20 notifies a driver of the scheduled date B on which the vehicle 500 enters the fuel maintenance mode, the driver can drive the vehicle 500 using the engine 200 gradually before the fuel maintenance mode is entered, for example, as illustrated by a dash-dot line in FIG. 3.

In this manner, displaying beforehand that the fuel maintenance mode is entered on the displaying unit 10 allows a driver to switch a driving state voluntarily. In other words, switching the driving state of the vehicle 500 based on a driver's intension allows hybrid travelling to be utilized or motive power from the engine 200 to be stored well in a form of quantity of electricity in the drive battery 310, consuming fuel effectively. This makes it easy to supply the predetermined amount of fuel before the fuel maintenance mode is entered.

The state displaying unit 11 displays a number of days until the scheduled date B on which the fuel maintenance mode is entered, and the cancelling fuel supply amount Q, so that the driver clearly understands that fuel supply of the cancelling fuel supply amount Q by the scheduled date B prevents the fuel maintenance mode from being entered and keeps a normal driving state. Although the state displaying unit 11 displays the days until the scheduled date B on which the fuel maintenance mode is entered in the embodiment illustrated in FIG. 2, it is noted that the state displaying unit 11 can directly display the scheduled date B on which the fuel maintenance mode is entered.

Description will be made about how the controlling unit 90 controls the displaying on the displaying unit 10 of the fuel maintenance guide system 100 having such a configuration, with reference to a flowchart of FIG. 5. It is noted that the controlling unit 90 includes an input/output device, a processor (central processing device), a memory device (ROM, RAM, etc.) for storing a control program, and the like, which are not illustrated. The memory device in the controlling unit 90 stores commands that the processor executes to perform processing according to the flowchart illustrated in FIG. 5.

First, the advance notification unit 20 of the controlling unit 90 determines whether an advance notification about the fuel maintenance mode is needed (step S101). In the present embodiment, the determination in step S101 is made in a form of determination based on the reference date A and the notification start date D set by the days-to-execute determining unit 91 as to whether a current elapsed period exceeds a period from the reference date A to the notification start date D, the current elapsed period being a number of days from the reference date A.

When the notification start date D is determined to be passed, the residual fuel detecting unit 211 detects a current residual fuel amount in the fuel tank 210 (step S102). The cancel condition determining unit 92 next uses the residual fuel amount detected in step S102 to determine the cancelling fuel supply amount Q (step S103).

Next, determination is made as to whether a period being the number of days from the reference date A exceeds a period from the reference date A to the scheduled date B (step S104). When the determination in step S104 results in NO, that is, when the period being the number of days from the reference date A is determined not to exceed the period from the reference date A to the scheduled date B, the advance notification unit 20 orders the notice information generating unit 93 to cause the displaying unit 11 to display the shift period being a number of days until the scheduled date B, and the notice information generating unit 93 causes the displaying unit 11 to display the shift period being the number of days until the scheduled date B, together with the cancelling fuel supply amount Q (step S105). By this process of step S105, how to appropriately cancel the fuel maintenance mode is displayed to a driver in a simple manner. Meanwhile, when the step S104 results in YES, that is, when the period being the number of days from the reference date A is determined to exceed the period from the reference date A to the scheduled date B, the notice information generating unit 93 causes the displaying of the cancelling fuel supply amount Q to blink (step S106). By this process of step S106, whether the fuel maintenance mode is entered can be visually determined, and the fuel maintenance mode is displayed to a driver in a simple manner.

Here, description will be made in detail about the determination of the cancelling fuel supply amount Q in step S103 and content displayed on the displaying unit 11 in step S105.

A conventional fuel maintenance guide system (the above Patent Literature) is configured to cancel a fuel maintenance mode on a condition that, for example, a predetermined fuel supply amount of about 15 L is supplied. In such a configuration to cancel the fuel maintenance mode with the predetermined fuel supply amount, how to cancel the fuel maintenance mode is indicated by displaying such a predetermined fuel supply amount on a display device such as a display.

In contrast, some drivers who use vehicles mainly as electric vehicles (EV mode) may drive the vehicles with only about 5 L of fuel kept in the fuel tank 210 in reserve. In a case of such drives, the predetermined fuel supply amount requires every time a fuel supply of 15 L to prevent the shift to the fuel maintenance mode, which brings about a state where a full replacement of fuel in the fuel tank 210 is required.

However, it is known that the shift to the fuel maintenance mode is unnecessary from the beginning when a given ratio, half at the most, of a residual fuel amount in the fuel tank 210 is replaced, which means that an excessive demand of fuel supply occurs when the residual fuel amount is small. In addition, only changing the cancelling fuel supply amount Q based simply on the residual fuel amount in the fuel tank 210 makes it difficult for a driver to visually understand how much fuel is loaded in the vehicle 500, and there is concern that this makes the cancelling fuel supply amount Q not understandable.

Hence, in the present embodiment, the fuel maintenance guide system 100 makes the cancelling fuel supply amount Q being the cancel condition changeable in accordance with the residual fuel amount and causes the cancel condition displaying unit 11*b* to display such a cancel condition. Specifically, the cancel condition determining unit 92 determines the cancelling fuel supply amount Q according to the residual fuel amount detected by the residual fuel detecting unit 211, and such a cancelling fuel supply amount Q is displayed on the cancel condition displaying unit 11*b*. In the example illustrated in FIG. 2, 7 L is displayed as the cancelling fuel supply amount Q. With such a configuration, how to appropriately cancel the fuel maintenance mode is displayed to a driver in a simple manner.

Returning to the flowchart of FIG. 5, subsequent to the process of step S105 or S106, when the residual fuel detecting unit 211 detects a fuel supply of the vehicle 500, comparison is made between an amount of the fuel supply and the cancelling fuel supply amount Q to determine whether the fuel supply amount is equal to or larger than the cancelling fuel supply amount Q (step S107). When the fuel supply amount> the cancelling fuel supply amount Q is satisfied in step S107, the reference date A of the fuel maintenance guide system 100 is updated, the fuel maintenance mode is cancelled (step S108), and the processing returns to step S101. In step S107, if a date on which such a fuel supply is carried out is before the scheduled date B illustrated in FIG. 3, the vehicle 500 is not in the fuel maintenance mode, and also in this case, the reference date A is updated, the scheduled date B is thus changed in turn, and the processing returns to step S102 as the fuel maintenance mode is not entered.

In other words, in the present embodiment, when the cancel condition is satisfied, the displaying unit 10 finishes displaying the cancelling fuel supply amount Q being the cancel condition and the shift period in step S108. In addition, when the displaying of entering the fuel maintenance mode is performed in step S106 as described above, such displaying is also finished in step S108.

In a case where the advance notification unit 20 displays the scheduled date B earlier than the scheduled date B by the predetermined time period C (step S105), determination may be made as to whether a current time falls within the predetermined time period C or is later than the scheduled date B, using the determination by start determining unit 94 (step S104).

In the above-described control based on the flowchart of FIG. 5, step S104 and step S106 may be omitted. In this case, even when the fuel maintenance mode is entered, the shift need not be displayed by a special displaying method, for example, displaying notification information in a blinking state as in the process of step S106. However, since the scheduled date or the number of days to reach the scheduled date is displayed in step S105, a driver can understand that the vehicle has entered the fuel maintenance mode.

In the present embodiment, the fuel maintenance guide system 100 includes the residual fuel detecting unit 211 being a detecting unit detecting the residual amount of fuel, the shift notice displaying unit 11*a* displaying notice of the shift to the fuel maintenance mode based on the residual amount detected by the residual fuel detecting unit 211, and the cancel condition determining unit 92 determining the cancelling fuel supply amount Q based on the residual amount detected by the residual fuel detecting unit 211. In addition, the fuel maintenance guide system 100 includes the cancel condition displaying unit 11*b* displaying the cancelling fuel supply amount Q from the predetermined time period before the shift to the fuel maintenance mode, the cancelling fuel supply amount Q varying according to the residual amount of the fuel.

In the present embodiment, the cancel condition is satisfied by a predetermined amount or larger of the fuel supplied to the vehicle 500. The notice information generating unit 93 displays the cancelling fuel supply amount Q satisfying the cancel condition on the cancel condition displaying unit 11*b*, in figures. Such a configuration allows a driver to visually grasp the condition for cancelling the fuel maintenance mode of the vehicle 500, which means that the fuel maintenance mode is displayed to the driver in a simple manner.

In the present embodiment, the smaller the residual amount of the fuel detected by the residual fuel detecting unit 91, the smaller the cancelling fuel supply amount Q. Such a configuration keeps the fuel supply amount necessary to cancel the fuel maintenance mode low, reducing an environmental load.

In the present embodiment, the displaying unit 10 displays the cancelling fuel supply amount Q as well as the shift period until the shift to the fuel maintenance mode. Such a configuration allows the cancel condition for the fuel maintenance mode and the shift period to be seen at a glance, which means that the shift to the fuel maintenance mode is displayed to a driver in a simple manner.

As above, a preferred embodiment of the present invention is described, but the present invention is not limited to such a specific embodiment, and various modifications and alterations may be made within the gist of the present invention as described and claimed herein unless otherwise limited in the above-described description. For example, the expression on the displaying unit is given in days in the present embodiment, but the expression may be given in hours. In addition, the fuel maintenance guide system is provided in the present embodiment in a form of a function of the controlling unit, but the fuel maintenance guide system is not limited to such a configuration, and the fuel maintenance guide system may be included in a system itself controlling the vehicle, may be provided in a scheme in which information is notified to the displaying unit from an outside of the vehicle, or may be provided in a scheme in which information is notified to an outside of the vehicle and the information is notified to a displaying unit such as an information terminal.

Advantageous effects described in DETAILED DESCRIPTION OF THE INVENTION are merely exemplary ones of most preferable effects produced by the present invention, and the advantageous effects of the present invention are therefore not limited to those described in DETAILED DESCRIPTION OF THE INVENTION.

What is claimed is:

1. A fuel maintenance guide system in a hybrid vehicle in which a shift to a fuel maintenance mode giving a priority to consuming fuel is executed automatically under a predetermined condition regardless of intention of a driver, the fuel maintenance guide system comprising:
   a residual fuel detecting unit detecting a residual amount of the fuel;
   a cancel condition determining unit determining a cancel condition for cancelling a shift to the fuel maintenance mode, based on the residual amount detected by the residual fuel detecting unit; and
   a displaying unit displaying the cancel condition determined by the cancel condition determining unit from a predetermined time period before the shift to the fuel maintenance mode.

2. The fuel maintenance guide system in a hybrid vehicle according to claim 1, wherein
   the cancel condition is satisfied by supplying a predetermined amount of fuel or an amount larger than the predetermined amount, and
   the predetermined amount varies based on the residual amount.

3. The fuel maintenance guide system in a hybrid vehicle according to claim 2, wherein the displaying unit displays the predetermined amount satisfying the cancel condition in figures.

4. The fuel maintenance guide system in a hybrid vehicle according to claim 2, wherein the smaller the residual amount, the smaller the predetermined amount satisfying the cancel condition.

5. The fuel maintenance guide system in a hybrid vehicle according to claim 3, wherein the smaller the residual amount, the smaller the predetermined amount satisfying the cancel condition.

6. The fuel maintenance guide system in a hybrid vehicle according to claim 1, wherein the displaying unit displays the cancel condition as well as a shift period until the shift to the fuel maintenance mode.

7. The fuel maintenance guide system in a hybrid vehicle according to claim 1, wherein the displaying unit finishes displaying the shift period on a condition that the fuel maintenance mode is entered, and changes the displaying to display that the fuel maintenance mode is entered.

8. The fuel maintenance guide system in a hybrid vehicle according to claim 1, wherein when the cancel condition is satisfied, the displaying unit finishes displaying the cancel condition and the shift period, or finishes the displaying indicating that fuel maintenance mode is entered.

9. The fuel maintenance guide system in a hybrid vehicle according to claim 1, wherein the shift period until the shift to the fuel maintenance mode is set with reference to an elapse period from fuel supply of a predetermined amount or larger of the fuel.

10. The fuel maintenance guide system in a hybrid vehicle according to claim 1, wherein the hybrid vehicle includes a motor driving wheels using electricity supplied from a battery, and an engine driving the wheels or an electric power generator using fuel supplied from a fuel tank, and has the fuel maintenance mode where the engine is made compulsorily to run under the predetermined condition, to prevent degradation or change in quality of fuel in the fuel tank.

* * * * *